W. H. HARRISON.
COMBINATION REED HOOK AND KNIFE.
APPLICATION FILED FEB. 16, 1921.
1,411,020.
Patented Mar. 28, 1922.
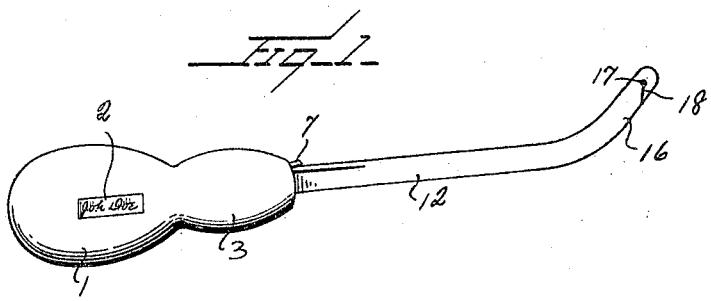
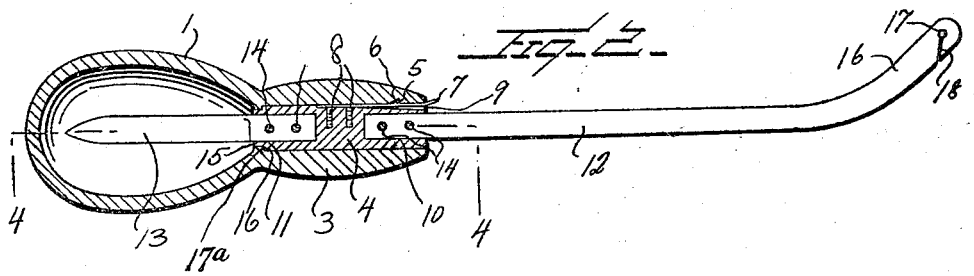
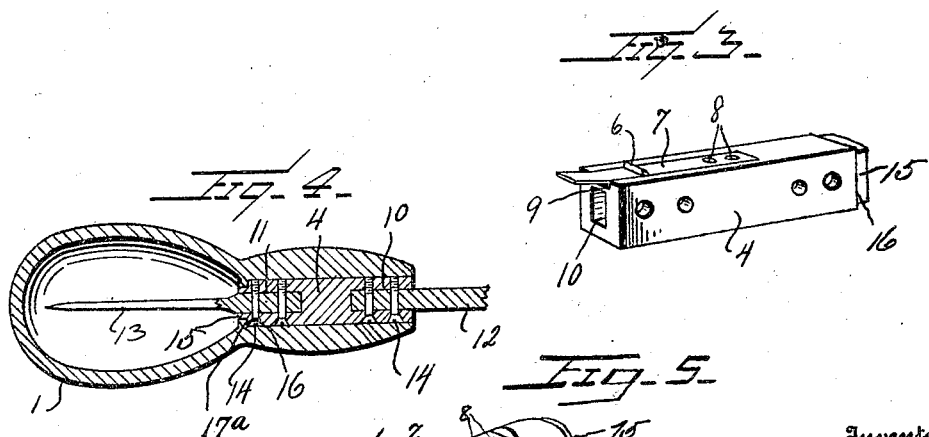
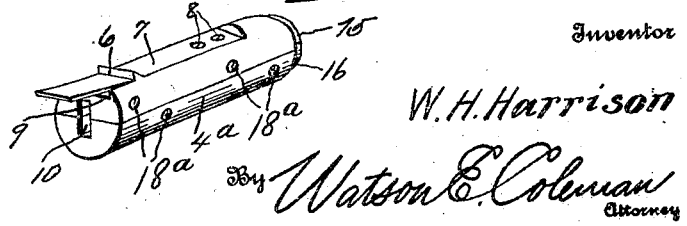
Inventor
W. H. Harrison
By Watson E. Coleman
Attorney

UNITED STATES PATENT OFFICE.

WILLIAM H. HARRISON, OF RALEIGH, NORTH CAROLINA.

COMBINATION REED HOOK AND KNIFE.

1,411,020.  Specification of Letters Patent.  Patented Mar. 28, 1922.

Application filed February 16, 1921. Serial No. 445,420.

*To all whom it may concern:*

Be it known that I, WILLIAM H. HARRISON, a citizen of the United States, residing at Raleigh, in the county of Wake, and State of North Carolina, have invented certain new and useful Improvements in Combination Reed Hooks and Knives, of which the following is a specification, reference being had to the accompanying drawings.

In cotton, woolen, and silk mills the weavers endeavor to procure the very best implement of this character, as is possible to obtain, and with this purpose in view it is the aim to provide an improved combination reed hook and knife, consisting of few parts, and wherein the handle may be made of brass, nickel, silver, or gold, or plated, and suitably decorated, and provided with a plain surface part, on which the owner's or weaver's name may be engraved. Obviously should the implement be lost, it would be returned to the owner.

Another purpose involves the provision of a hollow handle, and a chuck to engage in the handle, and means for holding a blade in one end of the chuck and a hook in its opposite end, so that when the chuck is in place in the handle, the blade is housed in the handle, and the hook is exposed for use. It is obvious that when it is desired to use the blade, the chuck and the hook may be removed, after which the hook may be detached from the chuck, the blade then secured in the end of the chuck formerly holding the hook, after which the chuck is reconnected to the handle.

Still another purpose consists in the provision of means for detachably holding the chuck in the handle. It is obvious that the handle houses and protects the blade, while the hook is being used, hence in this manner the blade is at all times ready for use, with the exception of detaching the hook and placing the blade in position on the chuck. The housing of the blade prevents the blade from becoming lost, or getting separated from the handle.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in perspective of the improved implement constructed in accordance with the invention.

Figure 2 is a longitudinal sectional view through the combination reed hook and knife, showing the means for holding the chuck and the blade and hook in the handle.

Figure 3 is an enlarged detail view in perspective of the chuck.

Figure 4 is a detail sectional view on line 4—4 of Figure 2.

Figure 5 is a detail perspective view of a cylindrical chuck, instead of a chuck rectangular in cross section.

Referring more especially to the drawings, 1 designates a handle, which may be any suitable size, shape or configuration, and carved or otherwise decorated, and constructed of any suitable material, preferably brass, nickel, silver, or gold, or plated.

The handle has a plain space 2 thereon, on which the owner's or weaver's name may be engraved, so that in case the implement is lost, it will be returned to the owner. Preferably the handle is hollow, and the contracted portion 3 of the hollow handle receives a chuck 4. The wall of the contracted portion 3 of the hollow handle is provided with a notch 5, which is engaged by the abutment shoulder 6 of a leaf spring 7, which is secured on one side of the chuck by a screw 8. The face of the chuck carrying the leaf spring is recessed as indicated at 9, so as to countersink the spring, in order to prevent lateral movement of the same. The opposite ends of the chuck having openings 10 and 11, which respectively receive the hook 12 and the blade 13. The end of the chuck which carries the hook 12 on one side thereof nearest the spring 7 is recessed or cut away, to receive the spring when depressed, so as to permit the shoulder 6 of the spring to engage and disengage the notch 5. The reed hook 12 and the blade 13 are of the usual construction as shown. Screws 14 are threaded through the side of the chuck, to hold the hook and the blade connected to the chuck, so that when the operator desires to extract the chuck, the hook or the blade may be grasped and a pulling action imparted thereon, the chuck and the blade will detach from the handle as one body. In other words by means of the screws 14, the blade 13 will remain attached to the chuck when it is being extracted from the handle.

As previously stated the hook is of the general construction, and has a curved end portion 16 provided with an opening 17 and a slot 18 connecting with the opening 17.

By depressing the free unattached end of the spring 7, it is obvious that the shoulder 6 will disengage from the notch 5, after which the chuck with its attached parts may be removed from the handle. After detaching the chuck the blade 13 may be detached and connected to the other end of the chuck in place of the hook, then the chuck may be reconnected to the handle. When the operator finishes with the blade, it may be detached, and the hook reconnected, and the blade reattached to its respective end of the chuck, and housed in the handle.

It is obvious that the chuck may be any suitable shape in cross section, either rectangular, cylindrical or otherwise shaped.

One end of the chuck has a reduced extension 15, there being an adjoining shoulder 16, which engages a shoulder 17ª of the inner end of the chuck receiving bore of the handle, thereby limiting the movement of the chuck therein, so that the tooth or shoulder 6 of the leaf spring will register with the shoulder 5 of the bore, so that the two shoulders may engage and prevent the extraction of the chuck. The interengaging shoulders 5 and 6 prevent outward movement of the chuck, while the shoulders 16 and 17ª limit the chuck in its inward movement. Also it is obvious that the chuck may be in one piece as shown in Figure 3, or in two pieces as shown in Figure 5, and in this case the screws 14 will pass through the two pieces of the chuck and through the shanks of the hook and the blade, and thereby secure the parts together. The two pieces of the chuck in Figure 5 have openings 18ª for the reception of the screws 14.

While it is herein stated that the hook may be detached from the chuck, and the blade then secured in the end of the chuck formerly holding the hook, it is obvious that the blade can be used otherwise. For instance the chuck may be removed from the handle, and the chuck employed as a small handle. In this case the chuck may be turned end for end, when either one of the tools is to be used.

The invention having been set forth, what is claimed as being useful is:

1. The combination with a storage container having a socket at one end opening into the body of the container, of a coupling chuck conforming to and adapted to engage said socket and having sockets at its ends, tools engaging the sockets of the chuck, one being housed in the storage container while the other is in use, the one in use adapted to be replaced by the one which is stored, means engaging transversely of the chuck to hold the tools in the sockets of the chuck, means carried by the chuck and operatively engaging the wall of the socket carried by the storage container, and means adjacent where the first socket opens into the storage container to be engaged by the chuck to limit the chuck in its inserting movement in its socket, in order to permit the chuck holding means to cooperate with the wall of its socket to hold the chuck in place.

2. The combination with a storage container having a socket at one end, of a coupling chuck engaging said socket and provided with sockets at its opposite ends, tools engaging the last named sockets, means carried by the chuck and engaging the wall of its receiving socket for holding the chuck in its socket, the chuck receiving socket opening into the storage container and having a shoulder at the point where said socket opens into the storage container, the inner end of the chuck being reduced, thereby causing a shoulder to be formed on the inner end of the chuck, to cooperate with the first shoulder to limit the chuck in its insertion in its socket.

3. The combination with a storage container having a socket at one end opening into the storage container, a coupling chuck conforming to and fitting the socket and being detachably fastened therein, the inner end of the chuck having a shouldered portion, and means adjacent where the chuck receiving socket opens into the storage container to be engaged by the shouldered portion to limit the chuck in its insertion in its socket, and tools carried by the opposite end of said chuck.

4. The combination with a storage container having a socket at one end opening into the storage container, a coupling chuck conforming to and fitting the socket and being detachably fastened therein, the inner end of the chuck having a shouldered portion, the inner end of the chuck receiving socket where it opens into the storage container having a shoulder to be engaged by the shouldered portion of the chuck to limit the chuck in its insertion in its socket, and tools carried by the opposite ends of the chuck.

5. The combination with a storage container having a socket at one end opening into the storage container, a chuck coupling conforming to and being detachably secured in said socket, means adjacent where the chuck receiving socket opens into the storage container to limit the chuck in its insertion in its socket, the opposite ends of the chuck having sockets, tools engaging the last named sockets, said chuck comprising two sections semi-cylindrical in cross section, said tools engaging said last named sockets in planes at right angles to the joint between the two sections of the chuck, and means passing through the sections of the chuck and the tools upon opposite sides of the joint, thereby securing the two sections together and at the same time holding the tools in position.

In testimony whereof I hereunto affix my signature.

WILLIAM H. HARRISON.